United States Patent Office 3,481,362
Patented Dec. 2, 1969

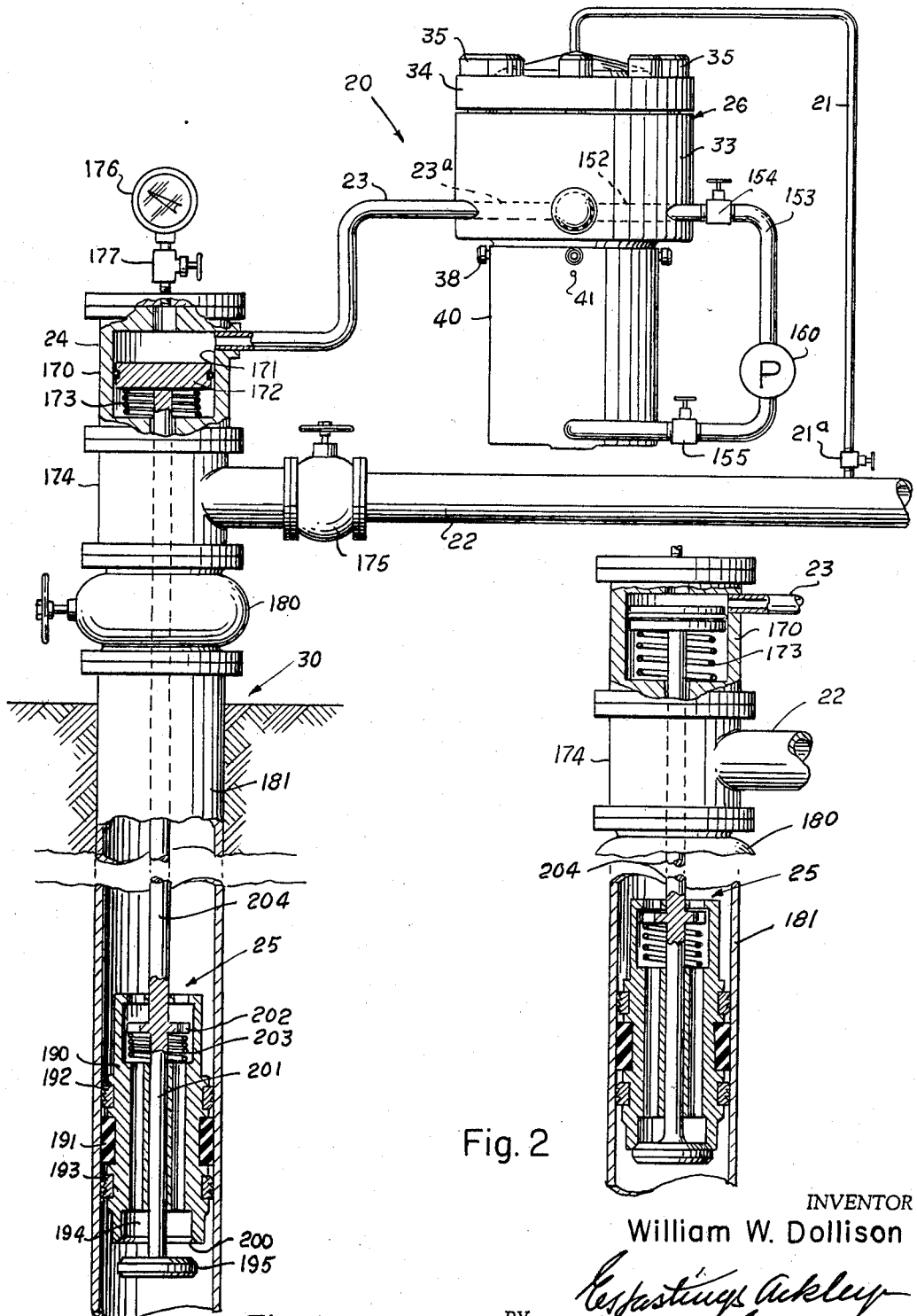

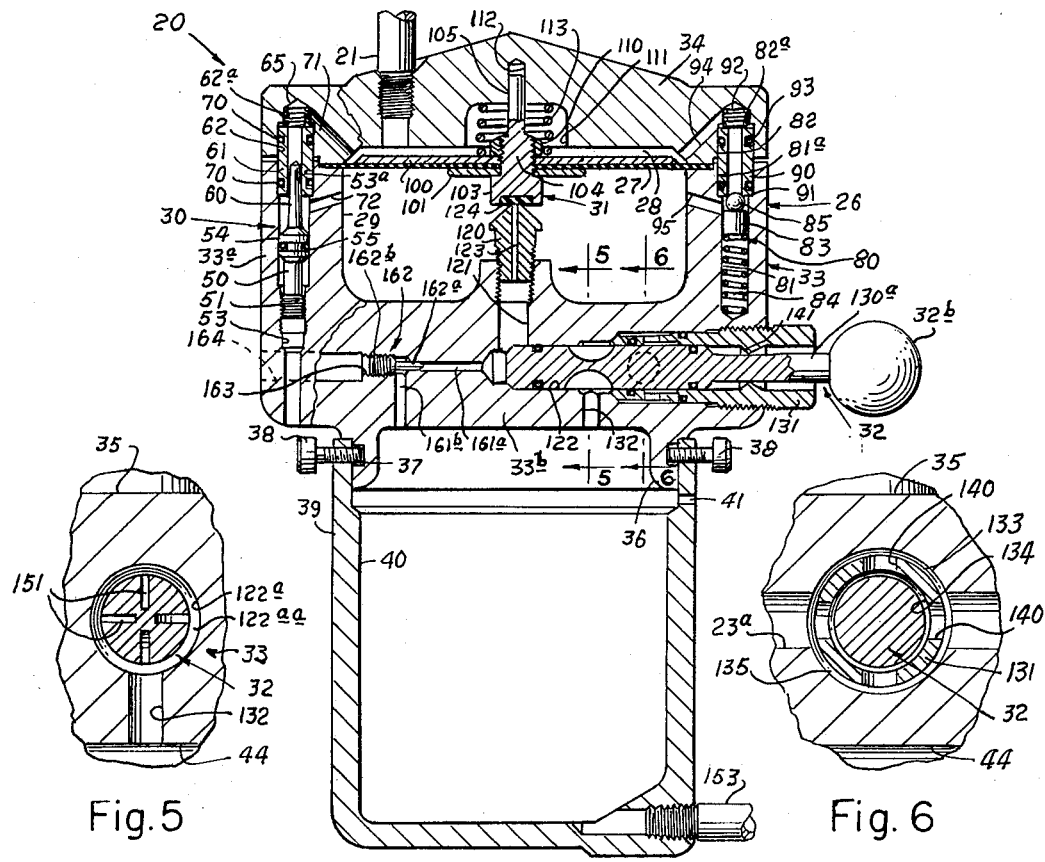
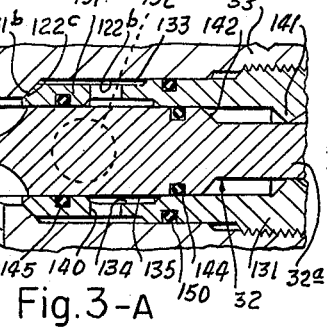
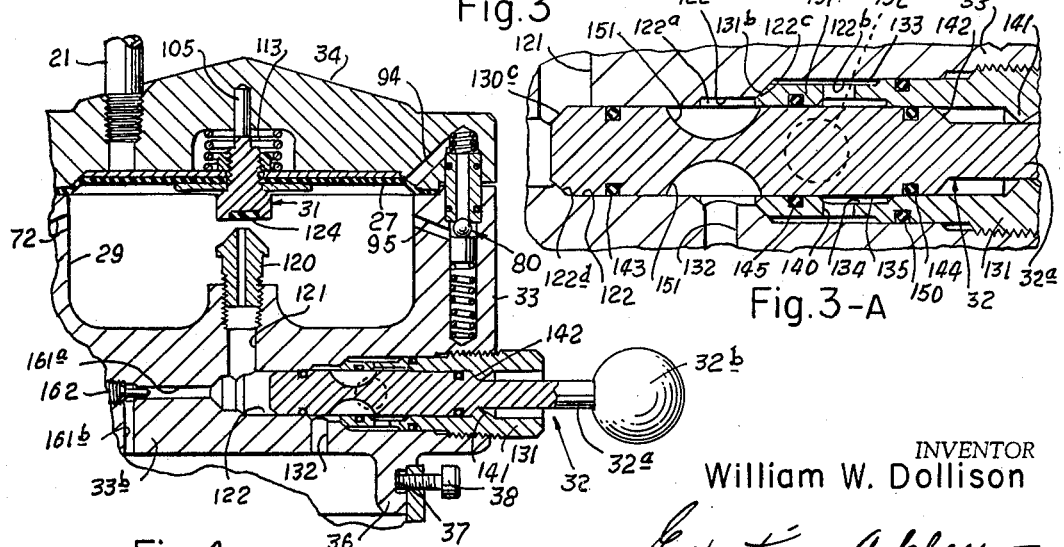

3,481,362
PRESSURE CONTROL DEVICE
William W. Dollison, Dallas, Tex., assignor to Otis Engineering Corporation, Dallas, Tex., a corporation of Delaware
Filed June 14, 1967, Ser. No. 645,995
Int. Cl. F16k 17/20
U.S. Cl. 137—460                    14 Claims

ABSTRACT OF THE DISCLOSURE

An appartus for relieving pressure within a first line connected thereto responsive to a predetermined rate of change of pressure within a second line including a pressure chamber, a diaphragm separating it into two portions communicating with each other through an equalizing valve, a first of the chamber portions being in communication with the second line while the second of the chamber portions communicates through a dump valve actuated by the diaphragm with a pressure release valve connected with the first line for relieving the pressure therein. The diaphragm is movable responsive to a pressure change in the second line which occurs at a rate faster than the pressure equalizing capacity of the valve between the chamber portions so that such change moves the diaphragm opening the dump valve allowing pressure in the second chamber to open the pressure release valve to relieve the pressure within the first line.

---

This invention relates to pressure control apparatus and more particularly relates to apparatus for controlling the pressure in one pressure system responsive to a rate of pressure change in excess of a predetermined value in another pressure system and to a system utilizing such control apparatus.

It is an object of this invention to provide a new and improved pressure controller for relieving pressure in one pressure system responsive to a change in a condition in another pressure system.

It is an object of the invention to provide a pressure release apparatus which releases pressure in a first line responsive to a rate of change of pressure in excess of a predetermined value within a second line.

It is another object of the invention to provide apparatus for relieving pressure within a first closed pressure system responsive to a rate of pressure change in excess of a predetermined value in another pressure system.

It is a further object of the invention to provide a control apparatus for releasing the pressure in a first fluid pressure system responsive to a rate of fluid pressure change in a second pressure system in excess of a predetermined value including a chamber divided into first and second compartments by a flexible diaphragm, means between the first and second compartments for equalizing the fluid pressure between the compartments at a predetermined rate less than the rate in the second system responsive to which this apparatus functions, the first of the compartments being connected with the monitored second pressure system whereby a change in the pressure in the monitored system at a rate in excess of a predetermined value which rate is greater than the equalizing capacity of the equalizing valve causes the diaphragm to be moved in the chamber, a dump valve associated with and actuated by the diaphragm for releasing the pressure within the second chamber responsive to movement of the diaphragm when the pressure within the first chamber is lowered at a rate greater than the pressure equalizing capacity of the equalizing valve, and a pressure release valve associated with the first pressure system actuated by fluid pressure transmitted thereto through the open dump valve in the second chamber for relieving pressure in such system.

It is another object of this invention to provide a well control system including a safety valve, an operator for the safety valve, and a pressure controller for relieving fluid pressure in the operator to close the safety valve responsive to a predetermined pressure change rate in a system monitored by the controller.

Additional objects and advantages of the invention will be readily apparent from the reading of the following description of a device constructed in accordance with the invention, and reference to the accompanying drawings thereof, wherein:

FIGURE 1 is a schematic view in section and elevation illustrating a pressure controller embodying the invention connected with a well head valve operator for controlling a valve positioned within the well;

FIGURE 2 is a fragmentary schematic view of the valve operator and the downhole valve in the well system of FIGURE 1 after the pressure in the valve operator has been relieved by the pressure controller and the valve has moved to its closed position;

FIGURE 3 is a sectional view along the line 3—3 of FIGURE 1 of the pressure controller showing its valves in positions maintaining pressure within the well head valve operator;

FIGURE 3–A is an enlarged fragmentary sectional view of a portion of the pressure release valve of the controller at its closed position;

FIGURE 4 is a fragmentary view in section similar to FIGURE 3 illustrating the controller with its dump and pressure release valves at their open positions for relieving the pressure within the valve operator;

FIGURE 5 is an enlarged fragmentary view in section along the line 5—5 of FIGURE 3; and, FIGURE 6 is an enlarged fragmentary view in section along the line 6—6 of FIGURE 3.

Referring to FIGURE 1 of the drawings a pressure controller 20 embodying the invention is connected by a line 21 through a valve 21a to a flow line 22 for monitoring the pressure in the flow line. The controller is also connected by a line 23 to a valve operator 24 which controls the opening and closing of a valve 25 disposed within a well 30. The controller is operative responsive to a predetermined rate of pressure change within the flow line 22 to relieve pressure within the valve operator for closing the valve 25 when the pressure within the flow line drops at a rate in excess of a predetermined value. For example, a rupture in the flow line lowers the pressure therein at a rate which is sufficiently rapid to actuate the controller to release the pressure within the valve operator which allows the valve 25 to move to a closed position thereby preventing further flow from the well into the flow line.

Referring to FIGURE 3, the controller 20 includes a housing 26 having a pressure chamber divided by a flexible diaphragm 27 into an upper chamber portion 28 and a lower chamber portion 29. The upper chamber portion communicates with the flow line 22 through the line 21 for conducting pressure changes in the flow line into the upper chamber portion. The upper and lower chamber portions communicate with each other through an equalizing valve 30 for equalizing the pressures on opposite sides of the diaphragm in the chamber portions at a rate less than the pressure change rate in the flow line at which the controller is adapted to actuate the valve operator 24. A dump valve 31 operated by this diaphragm releases pressure in the lower chamber portion to open a pressure release valve 32 which relieves the pressure in the line 23 deactivating the valve operator 24 allowing the safety valve 25 to close. The dump valve is activated when the pressure drops in the flow line at a rate sufficiently in excess of the equalizing capacity of the valve 30 so that the pressure differential across the diaphragm forces the diaphragm to flex sufficiently to open the dump valve.

The housing 26 has a body 33 with a cover 34 secured thereon by a plurality of circumferentially spaced cap screws 35, FIGURE 1. The housing base has a downwardly extending annular flange 36 having an external recess 37 which receives inward end portions of set screws 38 supporting a sump tank 39. The sump tank has a chamber 40 for receiving fluid exhausted through the valve 32 when the pressure is relieved in the valve operator. A vent port 41 is provided in the sump tank to keep its chamber 40 at atmospheric pressure.

The equalizing valve 30 includes a valve member 50 having a lower threaded portion 51 threaded into a bore 53 vertically disposed in the wall portion 33a of the housing base 33. The valve member 50 has an enlarged central portion 54 around which is disposed a ring seal 55 for sealing between the valve member and the wall of the bore 53. The valve member has an upper tapered end portion 60 which extends partially into a sleeve type seat member 61 disposed partially within an upper end portion 53a of the bore 53 and partially within a downwardly opening blind bore 62 of the housing 34. The upper end portion 53a of the bore 53 provides an upwardly facing annular shoulder surface 64 which the lower end face of the valve seat 61 engages limiting the valve seat against downward movement in the bore 53. The blind bore 62 of the head is reduced along an upper end portion 62a in which a spring 65 is disposed bearing against the upper end face of the valve seat 61 biasing the valve seat downwardly to its seated position on the shoulder 64 of the bore 53. The valve seat has upper and lower ring seals 70 which seal between it and the wall surface portions of the bores 53 and 62. The blind bore 62 communicates at its upper end into the upper chamber portion 28 through a downwardly and inwardly sloping flow passage 71 in the cover 34. The bore 53 communicates through a flow passage 72 in the body wall 33a with the lower chamber portion 29 below the diaphragm. The flow passage 72 opens into the bore 53 between the seat 61 and the enlarged valve member portions 54. The valve member 50 is provided with a screw driver slot or a socket wrench recess, not shown, in its lower end face so that the valve member is rotatable within the bore 53 by a tool inserted upwardly through the lower open end of the bore to adjust the position of the tapered upper end portion 60 of the valve member relative to the valve seat 61 thereby varying an orifice between the outer face of the tapered valve portion 60 and the inner face of the bore through the valve seat for adjusting the rate of pressure equalization through the equalizing valve between the pressure chamber portions 28 and 29 above and below the diaphragm.

An excessively high pressure within the upper chamber portion 28 above the diaphragm is relieved to prevent diaphragm damage by a downward force through a safety valve 80 disposed within aligned upwardly and downwardly opening blind bores 81 and 82 in the base and head portions respectively, of the housing.

A ball support and spring guide member 83 in the bore 81 is supported on and biased upwardly by a spring 84. A ball valve 85 is supported on the member 83 to coact with a valve seat sleeve 90 disposed within an enlarged upper end portion 81a of the bore 81 and a lower portion of the bore 82. An upwardly facing internal annular shoulder 91 at the base of the bore portion 81a supports the valve seat 90 against downward movement in the bore 81. The blind bore 82 has a reduced upper end portion 82a in which a spring 92 is disposed engaging the upper end face of the valve seat 90 biasing it downwardly against the shoulder surface 91. External annular ring seals 93 on the valve seat 90 seal between the seat and the wall surface portion of the bores 81 and 82. The upper end portion of the blind bore 82 communicates through the cover in a flow passage 94 into the upper chamber portion 28 above the diaphragm assembly. Similarly, the bore 81 communicates with the lower chamber portion 29 through a flow passage 95 which opens into the bore 81 below the valve seat 90. The ball valve 85 serves as a pressure relief valve allowing downward flow through the valve seat from the upper chamber portion 28 into the lower chamber portion 29 while serving as a check valve preventing upward flow from the lower pressure chamber through the valve seat into the upper chamber portion thereby limiting fluid communication from the lower chamber into the upper chamber to a path through the equalizing valve 30.

The outer periphery of the diaghragm 27 is clamped between the housing base and cover securing the diaphragm within the housing with the clamped portion of the diaphragm functioning as a gasket to prevent leakage from the pressure chamber. A portion of the diaphragm is confined between an upper plate 100 which is almost as large as the free portion of the diaphragm and a lower washer 101 by the valve member 31 which comprises a bolt having an enlarged lower head portion 103, an intermediate reduced threaded portion 104, and a further reduced upper end guide portion 105. The washer, diaphragm, and plate are secured on the bolt between its head portion and a nut 110 threaded on the intermediate portion of the bolt. The cover 34 of the housing has a central downwardly opening spring recess 111 into which a central downwardly opening coaxial blind guide recess 112 communicates. A diaphragm spring 113 is disposed within the recess 111 confined between the upper face of the plate and the surface portion of the cover defining the top of the recess 111. The bolt guide portion 105 extends in sliding relationship into the guide recess portion 112. The bolt guide portion is sufficiently smaller in diameter than the recess 112 to avoid trapping fluid within the recess above the bolt which might cause piston-like action to interfere with movements of the bolt and the diaphragm.

A dump valve seat 120 is vertically disposed within the lower pressure chamber portion 29 threaded into an upper end portion of a vertical flow passage 121 of the bottom 33b of the base 33. The passage 121 intersects an inward end portion of a graduated horizontal bore and flow passage 122 of the base 33. The valve seat 120 has an orifice 123 for fluid flow from the pressure chamber portion 29 downwardly into the flow passage 121. A flexible valve face member 124 is disposed in the lower face of the enlarged head portion 103 of the valve member 31 for engagement with the upper end face of the seat 120 over the orifice 123 to prevent flow from the chamber portion 29 into the orifice, FIGURE 3. When the face members is lifted by the diaphragm to a spaced position above the seat, FIGURE 4, the lower chamber portion 29 is open into the orifice 123.

The pressure release valve 32 is slidably disposed through a sleeve 131 in the horizontal bore 122 of the housing base. A vertical flow passage 132 communicates the horizontal bore 122 with the chamber 40 of the sump tank. The bore 122 is enlarged along a portion 122a extending beyond each side of the opening of the flow passage 132 into the bore providing an annular space 122aa around the valve 32 communicating with the passage 132. The bore 122 is further enlarged along an intermediate portion 122b which receives a reduced inward end portion 131a of the sleeve 131. The juncture of the bore portions 122a and 122b provides an internal annular seat surface 122c which is engaged by the tapered inward end surface 131b of the sleeve 131. The horizontal bore portion 122b is slightly larger than the inward end portion 131a of the sleeve 131 defining an annular space 133, FIGURE 6, around the sleeve portion 131a. The sleeve portion 131a has an internal annular recess 134 spaced inwardly from its inward end defining an annular space 135 within the sleeve around the valve 32. Spaced inwardly from its inward end the sleeve portion 131a has a plurality of circumferentially spaced ports 140 which provide communication between the annular space 133 through the sleeve into the annular space 135 around the valve rod within the sleeve. The sleeve 131 has an internal annular stop flange 141 which is engaged by an external annular outwardly facing stop shoulder 142 on the valve 32 limiting the outward movement of the valve rod in the bore 122, FIGURE 4. The valve 32 has a reduced outer portion 32a slidably extending through the stop flange 141. A handle 32b on the outward end of the valve reduced portion 32a permits manual manipulation of the valve. Inward movement of the valve is limited by the engagement of the tapered inward end surface 130c with an internal stop shoulder 122d at the intersection of the bores 121 and 122 so that fluid pressure is fully communicated from the passage 121 into the bore 122 aroung the inward end of the valve.

The valve 32 has an inward ring seal 143 which seals around the valve within the bore 122 between the intersection of the bore with the vertical passage 121 and the enlarged bore portion 122a thereby preventing fluid communication between the passage 121 and the annulus 122aa along the valve 32. The valve 32 also has an outward ring seal 144 which seals around the valve within the sleeve 131 outwardly of the annular 134. An internal ring seal 145 is disposed within the sleeve 131 between its inward end and its internal recess portion 134 to seal between the valve and the sleeve. The sleeve 131 also has an outer ring seal 150 positioned outwardly of its reduced inward end portion 131a to seal around the sleeve outwardly from the annular space 133 within the bore portion 122b. The sleeve surface 131b and the surface 122c are finished seat surfaces so that a seal is formed between the inward end of the sleeve at the surface 122c.

The valve 32 has a plurality of circumferentially spaced blind recesses 151 which are spaced from the inward end of the valve and are of such a length that when the valve is at its outward open position. FIGURE 4, fluid communication is provided between the annular space 135 through the recesses 151 past the ring seal 145 within this sleeve into the annular recess 122aa communicating with the flow passage 132 into the sump tank. Also, when the valve 32 is at its inward closed position, FIGURES 3 and 3-A, there is no fluid communication from the passage 132 and the recesses 151 in either direction along the valve in the bore 122.

The base 33 of the housing has coaxial flow passages 23a and 152, FIGURES 1 and 6, communicating into the annulus 133 around the sleeve 131. The passage 23a communicates with the line 23 connected into the valve operator 24, while the passage 152 communicates with a line 153 connected at its upper end into the base portion 33 of the housing and at its lower end into the base of the sump tank. The line 153 has an upper valve 154, a lower valve 155, and a pump 160 secured within the line between the upper and lower valves for transferring liquid from the sump tank back into the operator assembly 24 through the valve 32 and bore 33.

The base 33 of the housing has a horizontal flow passage 161a communicating into the inward end of the bore 122 and an intersecting vertical flow passage 161b communicating into the sump tank chamber to allow pressure bleed off from around the inward end of the valve 32 in the event of leakage past the dump valve 41 into the bore 121 which might force the pressure release valve 32 to an open position prematurely. Flow from the flow passage 161a into the passage 161b is controlled by a bleed off valve 162 having a tapered inward end portion 162a and a threaded enlarged outer end portion 162b which is threaded into a reduced threaded portion 163 of a bore 164 opening through the side face of the base 33 of the housing aligned circumferentially to avoid the equalizing valve bore 53. The bleed off valve outer end face has a screw driver slot or socket wrench recess, not shown, for adjustment of the valve by a tool inserted through the bore portion 164. Fluid leakage past the valve 162 flows into the sump tank.

The valve 32 is of uniform diameter along its entire portion within the sleeve 131 and bore 122, so that any fluid pressures applied to the valve between the ring seals 143, 144, and 145 do not bias the valve either inwardly or outwardly. The inward end portion of the valve 32 inward of the ring seal 143 is exposed to fluid pressure within the bore 122 communicated to it from the flow passage 121, while the portion of the rod outward of the ring seal 144 is exposed to atmospheric pressure. Movement of the valve in the bore 122 and sleeve 131 is resisted by frictional force between the outer surface of the valve along its surfaces engaging the surface portion defining the bore 122 and the inner surfaces of the sleeve 131 along with such friction as is provided by the ring seals 143, 144 and 145. In operation the valve 32 is forced outwardly to its open position by fluid pressure at its inward end and is returned manually to its inward closed position.

A particularly preferred use for the controller 20 is in a well system as previously discussed and illustrated diagrammatically in FIGURES 1 and 2 wherein the controller monitors the pressure within the flow line 22 controlling the operator 24 responsive to changes in the flow line pressure at a rate in excess of a predetermined value so that a rate change occasioned by such occurrences as a ruptured line actuates the controller to shut the safety valve 25 thereby closing off supply of fluid into the flow line from the well. Both the operator 24 and the safety valve 25 are disclosed in detail in the United States patent application entitled "Well Tools" by William W. Dollison, Ser. No. 626,162, filed Mar. 27, 1967. The operator unit 24 generally comprises a housing 170 provided with an internal chamber 171 in which a piston 172 is disposed for longitudinal movement. The piston is biased upwardly by a spring 173 and downwardly by the force of fluid pressure within the chamber above the piston supplied to the operator through the line 23 from the controller 20. The housing 170 is supported on a flow wing 174 to which is connected the flow line 22 through a valve 175. The flow wing is supported on the master valve 180 which shuts the well in when the operator unit and the safety valve are removed. The master valve is secured on the upper end of a well casing 181 in which the safety valve 25 is releasably locked. The operator 24 also includes a pressure gauge 176 secured to the housing 170 on a valve 177 for determining the fluid pressure within the chamber being applied to the piston 172.

The safety valve 25 generally comprises a body 190 around which is disposed on external annular seal 191 for sealing between the valve and the casing. Upper and lower locking means 192 and 193, respectively, are supported on the valve body for releasably locking the safety valve against both upward and downward movement within the well casing. The body has longitudinal flow passage means 194 into which flow is controlled by a longitudinally movable valve 195 adapted to seat with the lower end surface 200 of the valve body. The valve 195 is supported on a valve stem 201 having a perforated flange 202 which serves as an upper spring stop and permits fluid flow within the body past the flange. A spring 203 is confined within the body engaging the stem flange 202 biasing the valve stem upwardly and the valve 195 toward its closed position. The valve stem is connected with the operator 24 by an elongated operator rod 204 which is held at a lower position as shown in FIGURE 1 to hold the valve 195 at its lower open position against the forces of the springs 203 in the valve and 173 in the operator 24 along with the upward forces applied to the valve system by fluid flowing upwardly within the well bore through the valve. Fluid pressure within the chamber 171 above the piston 172 supplied through the line 23 biases the piston, the operator rod, and the valve 195 downwardly to hold the valve at its open position against the upward forces of the springs and the upwardly flowing fluid. When the fluid pressure in the operator is below a predetermined value the springs assisted by the fluid pressure differential within the fluid in the well bore across the valve lift the valve to its closed position.

After the well 30 has been equipped with the safety valve 25 and the operator 24, the pressure controller 20 is connected with the operator as illustrated in FIGURE 1. When the safety valve and operator unit are installed the safety valve is closed and remains closed until moved to its open position by fluid pressure within the operator acting downwardly on the piston 172. Fluid to be employed in the operator unit for holding the safety valve open is introduced into the sump tank chamber 44 of the controller. The fluid may be placed in the tank by removing the tank after its set screws 38 are unscrewed from the flange 36. After the desired quantity of fluid is placed in the tank, the tank is resecured to the housing. If line 153 is flexible, the tank is removed and reinstalled without disconnecting it. The fluid is preferably a suitable liquid, such as hydraulic fluid, which is reasonably safe, easy to handle, and non-corrosive. The controller 20 is adjusted for transferring the fluid from the sump tank into the operator 24 for opening the safety valve and holding it at an open position so long as the pressure fluctuations within the flow line 22 remain within predetermined limits of rate of change.

The controller 20 is adjusted for normal operation including the transfer of the fluid from the sump tank into the operator and for maintaining the pressure of the fluid in the operator until such time as the rate of pressure change exceeds a predetermined value in the flow line. The valve 32 is manually moved inwardly to its closed position by its handle 32b, until its inward tapered end portion 130c engages the internal shoulder surface 122d of the bore 122, FIGURES 3 and 3a. At this position of the valve the ring seal 143 seals with the wall surface portions defining the bore 122 between bore 121 and the annulus 122aa so that there is no fluid communication between the sump tank and the line 21 leading to the pressure chamber lower portion 41. Also there is no fluid communication along the valve into the flow passage 132 leading into the sump tank chamber from the flow passages 151 and 23a since the ring seals 144 and 145 seal along the valve 32 on opposite sides of the annular space 135 which communicates through the sleeve ports 140 and the annular space 133 into the flow passages 152 and 23a.

The bleed valve 162 is adjusted by insertion of a suitable tool into the bore portion 164 until it permits a small quantity of fluid to flow from the passage 161a into the passage 161b leading into the sump tank. The bleed valve prevents a pressure build up at the inward end of the valve 32 in the bore 122 due to leakage past the dump valve 31 which might force the valve 32 to an open position. Such leakage passes downwardly through the bore portion 121 into the inward end portion of the bore 122. The leaking fluid flows then through the passage 161a, past the bleed valve, and downwardly into the sump tank through the passage 161b. Thus, with the valve 32 positioned as shown in FIGURE 3, a small quantity of leakage may occur past the inward end of the valve from the bore 121 into the sump tank, fluid communication is prevented from the bore 121 outwardly along the valve 32 into the sump tank, and fluid communication also is prevented along the valve member 130 between the sump tank flow passage 132 and the annular spaces 135 and 133 around the valve member.

The equalizing valve 30 is adjusted by a suitable tool, such as a screw driver, inserted into the bore 53 below the valve to position the tapered upper end portion 60 relative to the valve seat 61. The upper and lower pressure chamber portions 28 and 29 communicate with each other through the flow passages 71, 53, and 72. The equalizing valve is adjusted to allow predetermined fluid communication past the valve which permits pressure equalization across the diaphragm 40 at a rate commensurate with normal pressure fluctuations within the flow line 22 as transmitted into the upper pressure chamber portion through the line 21. The equalizing valve allows pressure equalization across the diaphragm during normal flow line pressure fluctuations without moving the diaphragm sufficiently to raise the valve member 31 off the valve seat 120. The equalizing valve does not permit pressure equalization across the diaphragm at more rapid rates of pressure change within the flow line such as occurs with a rupture of the line causing a substantial abrupt decrease in the pressure above the diaphragm in the chamber portion 42. Thus the valve 30 is adjusted to allow pressure equalization at a rate less than the rate at which operation of the controller is desired to deactivate the operator 24.

The valves 154 and 155 in the line 153 are opened and the pump 160 is operated to transfer hydraulic fluid from the sump tank chamber into the operator unit 24 to open the valve 25. The hydraulic fluid is drawn by the pump from the sump tank into the line 153 and discharged upwardly through the valve 154 into the flow passage 152 in the base of the housing. The fluid flows from the flow passage 152 into the annular space 133 around the valve sleeve 131 and through the ports 140 in the valve sleeve and the annular space 135 within the valve sleeve around the valve 32 into the flow passage 23a. As previously discussed, the fluid in the annular spaces 133 and 135 may not flow along either the sleeve 131 or the valve 32 inwardly or outwardly due to the ring seals 144, 145, and 150 and the seated relationship between the end surface 131a of the valve sleeve and the internal shoulder surface 122c. Thus, all fluid being pumped into the flow passage 152 passes the valve sleeve 131 and valve 32 and flows into the passage 23a. The fluid then flows into and through the line 23 into the chamber 171 of the operator forcing the piston 172 downwardly against the upward forces of the fluid pressure differential across the safety valve 25 and the springs 173 in the operator and 203 in the safety valve. As the hydraulic fluid from the sump tank is pumped into the operator unit air is bled from the system through the top of the operator unit by either removing the pressure gauge 176 until all the air has escaped through the valve 177 or by provision of a special bleeder valve, not shown, connected between the valve 177 and the pressure gauge. Alternatively, the valve 177 may be a three position valve permitting selected communication into the pressure gauge and for bleeding air from the system.

When the pressure of the hydraulic fluid in the operator 24 reaches a sufficiently high value the safety valve 25 is forced downwardly by the piston to its open position. The valves 154 and 155 are closed, and, if desired, the pump 160 is removed. If the pump 160 is to remain in the system it is necessary only to close the valve 154 thereby confining the hydraulic fluid to the operator 24, the line 23, the flow passages 23a and 152 of the controller 20 into the line 153 to the valve 154. The valve 32 remains at its inward closed position holding the pressure in the operator and the safety valve open until the valve 32 is opened by the predetermined rate of pressure change in the flow line.

The pressure in the hydraulic fluid when the operator unit is holding the safety valve open generally will not exceed 50 to 70 pounds and the quantity of hydraulic fluid involved is quite low, generally no more than a few quarts within the total system, including the operator, the controller, and the connecting lines. The controller is preferably placed at the well head minimizing the quantity of hydraulic fluid involved. The hydraulic fluid remains in a sealed static condition holding the pressure within the operator at a sufficient level to maintain the safety valve open so long as the operator pressure is not relieved by the controller due to a rapid pressure change in the flow line 22 or until such time as the safety valve is manually closed. The valve 25 may be closed by relieving the pressure within the operator as by opening the valve 154 to allow the hydraulic fluid to be displaced back into the sump tank through the line 153 or by manipulation of the valve 32 as described below.

When flow is established from the well 30 in the flow line 22 the pressure of the fluid is transmitted to the controller 20 through the line 21 and its valve 21a. During the initial steps of bringing the controller into operation, as when flow is first established in the flow line, it may be preferred that the pressure in the flow line communicated to the controller through the line 21 be gradually raised by regulation of the valve 21a, particularly where the flow line pressure is sufficiently high that its sudden communication into the controller might damage the diaphragm 27 or some of its other components.

When the flow line pressure is initially communicated into the controller the pressure is communicated into the upper pressure chamber portion 28 above the diaphragm while the pressure within the lower chamber portion 29 below the diaphragm generally is atmospheric. As the pressure within the upper chamber portion increases a pressure differential develops across the diaphragm which is equalized by the valve 30 and the safety valve 80, if the pressure rise is rapid. As the pressure rises in the upper chamber portion to a value above the pressure in the lower chamber portion, the higher upper chamber pressure is transmitted through the flow passage 71, the equalizing valve 30, and the flow passage 72 into the lower pressure chamber portion. The higher upper chamber pressure is transmitted through the equalizing valve into the lower chamber portion until the pressures above and below the diaphragm are equal thereby eliminating a pressure differential across the diaphragm 40 tending to move it either upwardly or downwardly. If the pressure rise in the upper chamber portion occurs at too rapid a rate for compensation by the equalizing valve 30 which might damage the diaphragm the pressures are equalized through the safety valve 80. The higher pressure is transmitted through the flow passage 94 and downwardly in the bore 82 through the valve seat 90 forcing the ball valve 85 downwardly against its spring 84 allowing the pressure increase to be transmitted past the ball valve into the lower chamber portion through the flow passage 95. A pressure rise in the upper chamber portion at a relatively low rate which can be accommodated by the equalizing valve does not actuate the safety valve since the safety valve is provided to compensate for high pressure rate increases in the upper chamber portion which might tend to force the diaphragm 40 downwardly sufficiently to damage it since the normal position of the diaphragm is at the relaxed position shown in FIGURE 3 with the valve member 124 engaging the valve seat 120.

After the flow line pressure is communicated into and the pressure equalized in the controller so that the pressure within the upper and lower chamber portions above and below the diaphragm are substantially equal to flow line pressure, the only force holding the valve member 124 on the seat 120 is the force exerted by the compressed spring 113 against the upper face of the diaphragm plate 100. So long as any pressure differentials across the diaphragm are insufficient to lift it against the force of the spring 113 the valve member 124 remains on the seat 120 and the pressure release valve 32 remains at its inward closed position holding the pressure within the operator 24 and thereby holding the safety valve at its lower open position.

The controller 20 functions independently of the actual values of either the pressure within the flow line or the changes in pressures but rather is responsive to the rate of pressure change. Pressure changes, both increases and decreases, within the flow line are transmitted into the upper pressure chamber portion 28 through the line 21. A pressure increase in the upper chamber portion is transmitted through the equalizing valve into the lower chamber portion until the higher pressure is established both above and below the diaphragm thereby eliminating a pressure differential across the diaphragm. If the rate of a pressure increase above the diaphragm is above a predetermined value which exceeds the equalizing capacity of the valve 30 sufficiently that damage to the diaphragm may occur, the higher pressure above the ball valve 85 of the safety valve 80 forces the ball valve downwardly against the spring 84 allowing the higher pressure to be communicated through the flow passage 94 and the safety valve into the lower pressure chamber portion through the flow passage 95 to accelerate the pressure equalization. Since a pressure increase in the upper pressure chamber portion forces the diaphragm downwardly and presses the valve member 124 against its seat 120 more tightly, the valve 32 is not affected and pressure is maintained in the operator and thus the safety valve 25 remains open.

A pressure reduction in the flow line is also transmitted into the upper chamber portion 27 of the controller through the line 21 and thereby develops a pressure differential across the diaphragm 40 until the higher pressure in the lower chamber portion is reduced to equalize the pressure above and below the diaphragm through the equalizing valve 30. If the pressure reduction rate is within the normal limits for which the controller is adjusted, the pressure differential across the diaphragm is reduced at a sufficiently rapid rate that the upward force on the diaphragm is insufficient to overcome the spring 113 so that the valve member 124 remains on the seat 120 over the orifice 123. As soon as the pressures are equalized through the valve 30 the same lower pressures exist within the housing both above and below the diaphragm as in the flow line 22. This varying state of equilibrium between the pressures above and below the diaphragm within the controller and in the flow line continues so long as the pressure change rates are within predetermined limits and the valve 32 remains closed.

When a pressure decrease occurs within the flow line at a rate which exceeds the normal equalizing capacity of the valve 30, such as a sudden loss of pressure within the flow line due to a rupture in the line, the valve 32 is opened to relieve the hydraulic fluid pressure in the operator for closing the safety valve 25. The sudden pressure decrease is transmitted from the flow line through the line 21 into the upper chamber portion 27. The pressure within the lower chamber portion is equal to the pressure in the flow line immediately before the sudden pressure decrease in the flow line and thus the sudden substantially lower pressure above the diaphragm results in an upward force on the diaphragm since the equalizing valve 30 is incapable of transmitting pressure at a sufficiently rapid rate to equalize the pressures across the diaphragm prior to compression of the spring 113. The diaphragm is forced upwardly to the position illustrated in FIGURE 4 compressing the spring and lifting the valve member 124 off the seat member 120.

When the valve member 124 is lifted from the seat 120 the orifice 123 is opened into the lower pressure chamber portion 29 permitting the pressure within the lower chamber portion to be transmitted downwardly through the orifice 123 into the bore 121. Immediately prior to the opening of the dump valve 31 the pressure within the passages 121 and 122 around the inward end of the valve 32 is about atmospheric due to the communication through the bleed valve 162 into the sump tank which is vented through the port 41 to the atmosphere. The increased pressure is transmitted into the passages 121 and 122 around the inward end portion of the valve 32 inwardly of the ring seal 143. The rate of pressure increase within the bore 122 substantially exceeds the capacity of the bleed off valve 162. The increased pressure acts on the inward end portion of the valve 32 over an effective area defined within the line of sealing engagement of the ring seal 143 with the inner wall surface of the housing base defining its bore 122. The outward portion of the valve 32 is exposed to atmospheric pressure over an effective area defined by the line of sealing engagement of the ring seal 144 with the surface defining the bore wall of the sleeve 131. The valve 32 is also subjected to atmospheric pressure transmitted through the sump tank and the passage 132 to the valve between the ring seals 143 and 145 which does not bias the valve in either direction. Similarly, the pressure from within the operator 24 is transmitted through the line 23 and the flow passage portion 23a around the valve member between the ring seals 144 and 145 which also does not bias the valve in either direction since the net areas sealed by the two ring seals are equal. The total forces applied to the valve 32 by the pressure to which it is exposed produce a net force outwardly on the valve which is resisted only by the friction between the wall of the bore 122, the various ring seals, and the valve 32. The outward force on the valve moves it outwardly until its shoulder surface 142 engages the stop flange 141 of the sleeve 131, FIGURE 4. At this position of the valve its recesses 151 extend between the base 122 and the sleeve to opposite sides of the ring seal 145 communicating the annular space 135 within the sleeve around the valve member with the annular space 122aa around the valve member at the passage 132 into the sump tank. The hydraulic fluid under pressure within the operator 24, the line 23 and the passage 23a is released when the valve 32 moves to its outward open position. The hydraulic fluid flows from the passage 23a into the annular space 133 around the sleeve 131, FIGURE 6. The fluid then flows radially inwardly through the ports 140 into the annular space 135 within the sleeve around the valve. Since the slots 151 of the valve 32 communicate with the annular space 135, the fluid flows into the several valve slots and inwardly in the slots past the ring seal 145. The fluid flows from the slots 151 into the annular space 122aa around the valve and through the passage 132 into the sump tank. The fluid flows from the operator 24 into the sump tank until a sufficient quantity of the hydraulic fluid has been displaced out of the operator to allow the piston 172 to be lifted by the springs 173 and 203 of the operator and safety valve, respectively, along with the pressure differential across the safety valve to move the safety valve upwardly to its closed position. With the safety valve closed, the flow line pressure reaches a stable value which in the case of a rupture generally is atmospheric so that without pressure fluctuations the pressures are equalized within the controller across the diaphragm. The spring 113 forces the diaphragm back downwardly to its normal position with the valve member 124 engaging the seat 120.

The operator and controller are reactivated for reopening the safety valve using the same procedural steps as outlined above for initially placing the controller in operation. The pressure release valve 32 is returned inwardly to a closed position by manipulating its handle 32b until its inner tapered end surface 130c engages the internal shoulder 122d around the bore 122. The valves 154 and 155 are reopened and the hydraulic fluid is returned from the sump tank through the line 153, the flow passages 152 and 23a into the line 23, the fluid passing, as previously described, through the annular spaces 133 and 135 around and within the pressure release valve sleeve 131. The fluid flows through the line 23 into the operator repressuring it to force the piston 172 downwardly for reopening the safety valve. Since the sump tank is vented to the atmosphere air may get into the system when the controller releases the pressure in the operator unit and thus it may be necessary to once again bleed the air from the system, as previously discussed, while reactivating the operator and controller.

The bleed valve 162 allows any fluid leaking through the dump valve 31 when at its closed position into the orifice 123 to flow from the passage 121 through the passage 161a, past the bleed valve, and downwardly through the passage 161b into the sump tank to avoid a pressure build-up around the inward end of the pressure release valve 32 due to leakage from the lower pressure chamber portion which might otherwise develop sufficient pressure to move the valve outwardly prematurely. Preferably, the bleed valve is adjusted initially to permit leakage past it so that if such leakage occurs while the unit is functioning unattended it will not result in the actuation of the controller and consequently cause the safety valve to be closed.

While the controller 20 has been illustrated and described in combination with and for controlling a particular type of safety valve and surface operator, it is to be understood that the controller is adaptable to other systems wherein hydraulic pressure performs a particular function, and release of such hydraulic pressure is desired responsive to a predetermined pressure change rate montitored by the controller. For example, other types of safety valves which are held open by hydraulic fluid pressure and which are operable by the controller in accordance with the present invention are the Otis Types ST and L Tubing Safety Valves illustrated at pages 3842 and 3843 of the Composite Catalogue of Oil Field Equipment and Services, 1966–67 edition, published by World Oil, Houston, Tex.

It will now be seen that new and improved pressure control apparatus has been described and illustrated.

It will also be seen that new and improved apparatus has been described and illustrated for relieving fluid pressure in a first line responsive to a rate of pressure change within a second line.

It will also be seen that the apparatus relieves the pressure within a first closed pressure system responsive to a predetermined pressure change rate in a second pressure system monitored by the apparatus.

It will be further seen that the control apparatus includes a pressure chamber separated by a flexible diaphragm into separate portions connected through an equalizing valve, the diaphragm controlling a pressure release valve for relieving fluid pressure in a first system connected thereto, a second system being connected into the pressure chamber on one side of the diaphargm, and the equalizing valve being adjusted to equalize the pressure within the chamber on opposite sides of the diaphragm at a rate less than the pressure change rate at which the controller is adapted to relieve the pressure in the first pressure system.

It will be further seen that the apparatus includes a dump valve actuated by the diaphragm for controlling pressure communication to the pressure release valve responsive to opening the dump valve when the diaphragm is displaced by a pressure change rate in the monitored pressure system in excess of a predetermined value.

It will be further seen that a new and improved well control system has been described and illustrated including a safety valve, an operator for holding the safety valve open responsive to fluid pressure supplied thereto and a controller adapted to relieve the pressure within the operator responsive to a predetermined pressure change rate in a monitored pressure system.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. Apparatus comprising: a first pressure system; a second pressure system; control means connected between said pressure systems for relieving pressure in said first system reponsive to a predetermined pressure decrease rate in said second system; said control means including a pressure operated pressure release valve connected with said first system for relieving pressure therein; a housing having a pressure chamber; a flexible diaphragm in said pressure chamber dividing said chamber into first and second chamber portions; passage means communicating said first chamber portion with said pressure release valve; dump valve means associated with said passage means between said first chamber portion and said pressure release valve for communicating pressure from said first chamber portion to said pressure release valve when the pressure differential across said diaphragm exceeds a predetermined value; means communicating said second chamber portion with said second pressure system whereby pressure changes in said second system are transmitted into said second chamber portion; and pressure equalizing means between said first and second chamber portions comprising passage means between said chamber portions and adjustable orifice means in said passage means for controlling the rate of pressure equalization between said chamber portions for equalizing the pressure across said diaphragm at a rate at which the force on said diaphragm resulting from said pressure differential is insufficient to actuate said dump valve means when the pressure decrease rate in said second pressure system is below a predetermined value and to develop a pressure differential across said diaphragm resulting in sufficient force on said diaphragm to actutae said dump valve means when said pressure decrease rate exceeds said predetermined value; additional passage means between said first and second chamber portions, and safety valve means within said additional passage means for communication between said chamber portions when the pressure in said second chamber portion exceeds the pressure in said first chamber portion by a predetermined value to protect said diaphragm by preventing an excessive force on said diaphragm biasing said diaphragm toward said first chamber portion responsive to an excessive pressure differential from a higher pressure in said second chamber portion.

2. Apparatus as defined in claim 1 including spring means associated with said diaphragm for biasing said diaphragm toward said dump valve means for controlling the force required to displace said diaphragm for actuating said dump valve means.

3. Apparatus as defined in claim 2 including bleed valve means associated with said pressure release valve for relieving pressure transmitted to said pressure release valve by a leak in said dump valve means.

4. Apparatus as defined in claim 3 including a sump tank communicating with said pressure release valve for receiving fluid exhausted from said first pressure system when said pressure release valve is at an open position.

5. Apparatus as defined in claim 4 including means for returning fluid exhausted from said first pressure system into said sump tank to said first pressure system from said sump tank through said pressure release valve when said valve is at an open position.

6. Apparatus as defined in claim 5 including a pressure actuated operator in said first pressure system for holding a safety valve within said second pressure system at an open position responsive to a predetermined fluid pressure within said first pressure system and a safety valve in said second pressure system connected with said operator means and adapted to be held at an open position by said operator means.

7. Pressure control apparatus for releasing pressure within a pressure system connected thereto responsive to a predetermined rate of pressure decrease in a separate monitored pressure system comprising: a pressure release valve connectable with said first pressure system movable between open and closed positions for holding pressure in said first system and for releasing pressure from said first system when connected with said apparatus; a pressure vessel having a pressure chamber provided therein; a flexible diaphragm secured in said pressure chamber dividing said chamber into first and second chamber portions; means providing a flow passage communicating said first chamber portion with said pressure release valve for transmitting pressure to said valve from said first chamber portion for moving said valve from a closed to an open psoition; dump valve means associated with said passage means between said first chamber portion and said pressure release valve, said dump valve means being actuated by said diaphragm when a pressure differential applied across said diaphragm exceeds a predetermined value; means for connecting said second chamber portion with said monitored pressure system whereby pressure changes in said monitored pressure system are transmitted into said second chamber portion; and pressure equalizing means between said chamber portions comprising passage means between said chamber portions and adjustable orifice means in said passage means for equalizing the pressure within said chamber portions across said diaphragm at a rate to provide a minimum force on said diaphragm resulting from a pressure differential across said diaphragm between the pressures within said chamber portions so long as the pressure rate change in said monitored system remains below a predetermined value and for effecting a pressure differential across said diaphragm between said chamber portions when said pressure rate change in said monitored system exceeds said predetermined value; and safety valve means between said chamber portions to minimize the force on said diaphragm resulting from a pressure in said second chamber portion higher than a pressure in said first chamber portion comprising passage means between said chamber portions and valve means within said passage means for communicating said chamber portions when the pressure in said second chamber portion exceeds the pressure in said first chamber portion by a predetermined value.

8. Apparatus as defined in claim 7 including spring means associated with said diaphragm means for biasing said diaphragm toward said first chamber portion for holding said dump valve at a closed position until the pressure within said first chamber portion exceeds the pressure within said second chamber portion by a predetermined value responsive to a pressure decrease in said second chamber portion communicated to said chamber portion from said monitored pressure system.

9. Apparatus as defined in claim 8 including bleed valve means between said dump valve means and said pressure release valve for preventing a pressure build-up between said dump valve means and said pressure release valve means effected by leakage in said dump valve means when in closed position.

10. Apparatus as defined in claim 9 including a sump tank connected with said pressure release valve for receiving fluid exhausted through said valve from the pressure system connected thereto.

11. Apparatus as defined in claim 10 including fluid flow means between said sump tank and said pressure release valve for returning fluid exhausted from said first pressure system to said system through said release valve when said valve is at a closed position.

12. Pressure control apparatus for releasing pressure in a first pressure system responsive to a predetermined pressure decrease rate in a second pressure system monitored by said control apparatus comprising: a housing provided with a chamber; a flexible diaphragm supported within said chamber dividing said chamber into first and second chamber portions; a pressure release valve movable between a first closed and a second open position; means providing a flow passage to said pressure release valve and connectable with said first pressure system whereby pressure in said first pressure system is released through said release valve when said release valve is moved to said second open position; means providing a flow passage between said first chamber portion and said pressure release valve for applying pressure from said first chamber portion to said pressure release valve for moving said valve from said first closed to said second open position; a dump valve associated with said housing and said diaphragm actuated by movement of said diaphragm for controlling fluid communication from said first chamber portion into said passage to said pressure release valve; said housing having relief flow passage means extending from the outside thereof into said flow passage between said first chamber portion and said pressure release valve; a bleed valve in said relief flow passage means for releasing fluid leakage from said dump valve to protect said pressure release valve against opening other than when said dump valve is at an open position; means providing a passage in said housing into said second chamber portion for connecting said second pressure system to said control apparatus for monitoring pressure changes in said second pressure system; spring means associated with said diaphragm for biasing said diaphragm toward said dump valve for holding said dump valve at a closed position until a pressure differential within said chamber between a higher pressure in said first chamber portion and a lower pressure in said second chamber portion exceeds a predetermined value; said housing having first equalizing flow passage means between said first and said second chamber portions for equalizing the pressures in said chamber portions on opposite sides of said diaphragm; means providing an orifice within said first equalizing flow passage means whereby the pressures in said chamber portions are equalized at a rate sufficient to limit the pressure differential across said diaphragm between said chamber portions below a predetermined value whereby the force on said diaphragm resulting from said pressure differential is insufficient to move said diaphragm to open said dump valve so long as the pressure decrease rate in said monitored pressure system transmitted into said second pressure chamber portion remains below a predetermined value and for effecting a pressure differential between said chamber portion across said diaphragm in excess of said predetermined value whereby the force on said diaphragm resulting from said pressure differential moves said diaphragm to open said dump valve responsive to a pressure decrease in said monitored pressure system at a rate in excess of said predetermined value; and said housing having second equalizing flow passage means between said first and second chamber portions; and safety valve means in said second flow passage means for equalizing the pressure between said first and second chamber portions across said diaphragm when the pressure within said second chamber portion exceeds the pressure within said first chamber portion by a predetermined value.

13. Control apparatus as defined in claim 12 including a sump tank communicating with said pressure release valve for receiving fluid discharged from said first pressure system when said release valve is moved to said second open position.

14. Apparatus as defined in claim 13 including means for returning fluid from said sump tank through said pressure release valve to said first pressure system when said release valve is at said first closed position.

References Cited

UNITED STATES PATENTS

| | | | |
|---|---|---|---|
| 2,707,483 | 5/1955 | Shafer | 137—456 |
| 2,871,876 | 2/1959 | Edmund | 137—456 |

FOREIGN PATENTS

| | | |
|---|---|---|
| 396,502 | 6/1922 | Germany. |

WILLIAM F. O'DEA, Primary Examiner

W. H. WRIGHT, Assistant Examiner

U.S. Cl. X.R.

137—456, 464, 87, 486